April 26, 1966 M. A. SULLIVAN 3,247,545
MOLDING PRESS
Filed Sept. 18, 1964 2 Sheets-Sheet 1

INVENTOR
MATTHEW A. SULLIVAN

BY Seidel & Gouda

ATTORNEYS

April 26, 1966  M. A. SULLIVAN  3,247,545
MOLDING PRESS
Filed Sept. 18, 1964  2 Sheets-Sheet 2

INVENTOR
MATTHEW A. SULLIVAN

BY Seidel & Gonda

ATTORNEYS

United States Patent Office 3,247,545
Patented Apr. 26, 1966

3,247,545
MOLDING PRESS
Matthew A. Sullivan, Willow Grove, Pa., assignor to Sullifoam, Inc., Willow Grove, Pa., a corporation of Pennsylvania
Filed Sept. 18, 1964, Ser. No. 397,489
9 Claims. (Cl. 18—5)

This invention relates to a molding press, and more particularly a molding press which is adapted to mold articles from small moldable pellets or granules.

Heretofore, the molding of objects from small pellets or granules required complicated machinery and involved electrical timing controls. These controls are necessary in order to effect a completely automatic operating cycle of a molding press of this character. A typical operating cycle of a molding press for molding objects from small pellets or granules comprises bringing the platens of the press together to a stand-off position, preventing further movement of the platens toward each other while filling the molding chambers in the platens, introducing a heat transfer medium into each platen so as to effect expansion of the granules due to heat, closing the mold and applying pressure to mold an article of required shape, cooling the molded article and ejecting it from the press.

When molding certain types of plastics, such as polystyrene, a slight gap must be maintained between the molding chambers in the platens, to allow for the escape of gas generated by the plastic. This gap must be accurately controlled because as heat is applied to expand the pelletized material, it is necessary to contain the material within the molding chambers of the platens and prevent its leakage. Also, by being able to control the aforementioned gap, the gap can be set to accommodate a known amount of gas which will be generated by the pellets whereby the molding operation may be carried out with the same timing controls regardless of the load fed into the press.

Accordingly, it is the primary object of this invention to provide a molding press for molding articles from small expandable pellets such as polystyrene, which is simple in operation, comprises a minimum number of components, and incorporates reliable and accurate controls for effecting an automatic operating cycle.

Another object of this invention is to provide a molding press for forming molded objects from small granules wherein the platens of the press may be positioned accurately with respect to another so as to leave a small gap between the platens during the operating cycle of the press to enable gas generated by the heating of the small pellets to escape.

Yet another object of this invention resides in the provision of means in a molding press of the aforementioned character wherein the gap formed between the mold platens may be accurately controlled and adjusted.

Other objects will appear from the disclosure which follows hereinafter.

For the purpose of illustrating the invention, there is shown in the drawing a form which is presently preferred; it being understood, however, that this invention is not limited to the precise arrangements and instrumentalities shown.

Figure 1:
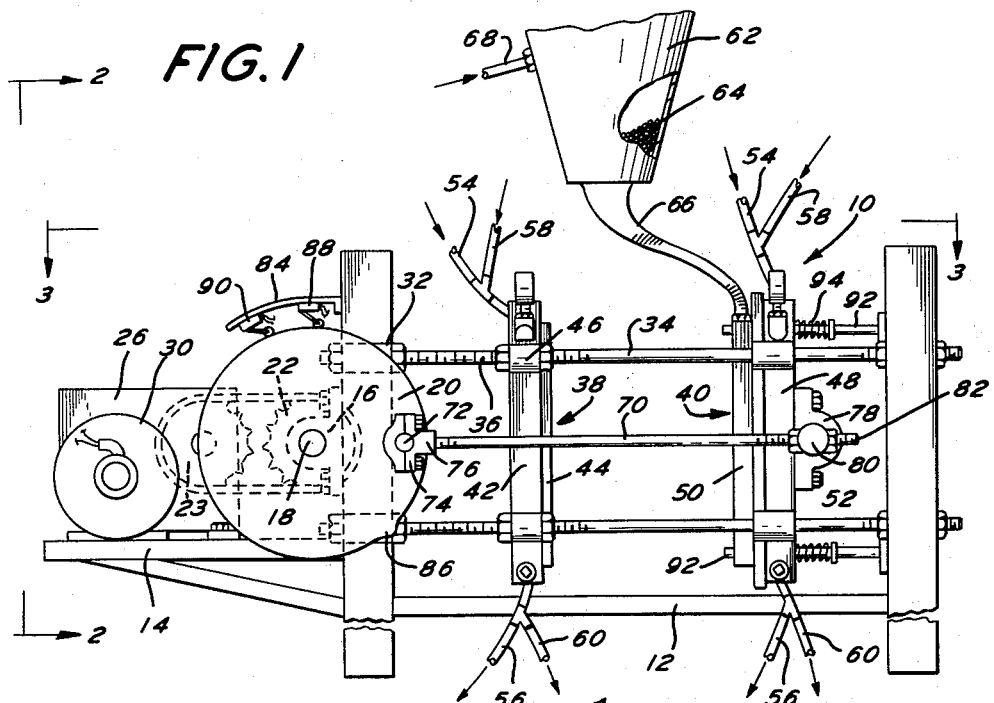
FIGURE 1 is a side view in elevation of the molding apparatus of the present invention.

Referring now to the drawings in detail, wherein like numerals indicate like parts, the molding apparatus comprising the subject matter of the instant invention consists of a molding press generally designated by the numeral 10.

The press 10 includes a frame 12 on which a platform 14 is supported at one end in cantilevered fashion. A pair of bearing blocks 16 are mounted upon a pair of spaced upright members of the frame 12 adjacent to the platform 14. A shaft 18 is rotatably supported by the bearings 16 and mounts a pair of large wheels 20 at both of its ends.

Secured to the shaft 18 is a sprocket 22. A speed reduction unit 26 is mounted on the platform 14 and has an output shaft which mounts a sprocket 23. The sprocket 23 is connected to the sprocket 22 by means of endless flexible chain 24. An electric motor 30 is also mounted on the platform 14. The drive shaft of the motor is connected through a magnetic friction clutch-brake unit 28 to the speed reduction unit 26. Therefore, it will be apparent that upon actuation of the motor 30, the shaft 18 and each of the wheels 20 can be caused to rotate in a single direction.

Mounted upon each of the upright frame members are a pair of spaced parallel internally threaded sleeves 32. The sleeves on each upright frame member are aligned with a corresponding sleeve on an adjacent frame member. Tie bars 34 are threadably connected to a pair of aligned sleeves at both of its ends and hence extend longitudinally of the frame 12.

Figure 2:
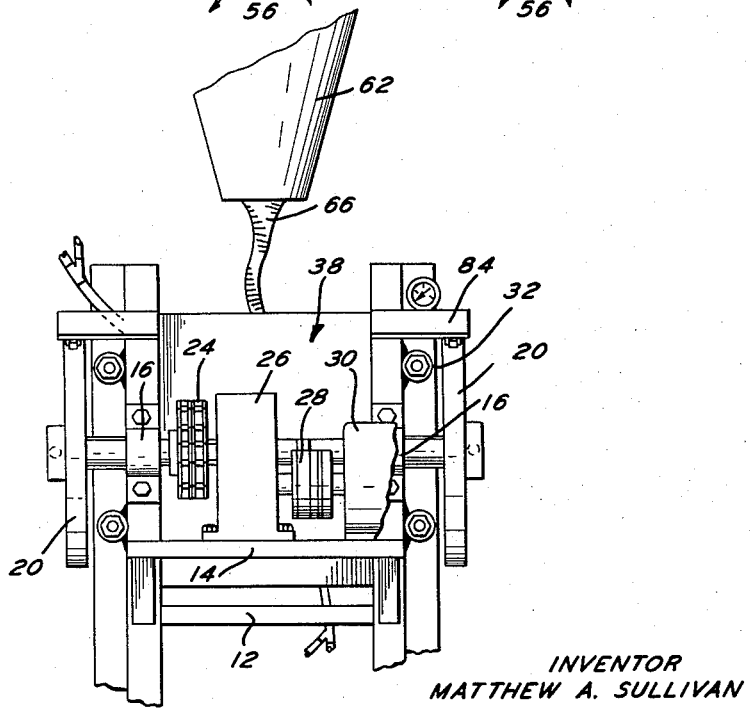
FIGURE 2 is an end view in elevation taken substantially along the plane indicated by the line 2—2 of FIGURE 1.

As shown most clearly in FIGURE 2, the tie bars 34 define the corners of a rectangle. Threadably connected to a threaded portion 36 of each of the tie bars 34 is a substantially rectangular stationary platen 38. Rigidly secured adjacent to the four corners of the platen 38 are tubular internally threaded sleeves 46 which mount the platen in fixed relationship upon the threaded portions 36 of the tie bars 34. Slidably mounted upon the tie bars 34 by means of threadless tubular sleeves 52 is a movable platen generally designated by the numeral 40.

Figure 4:
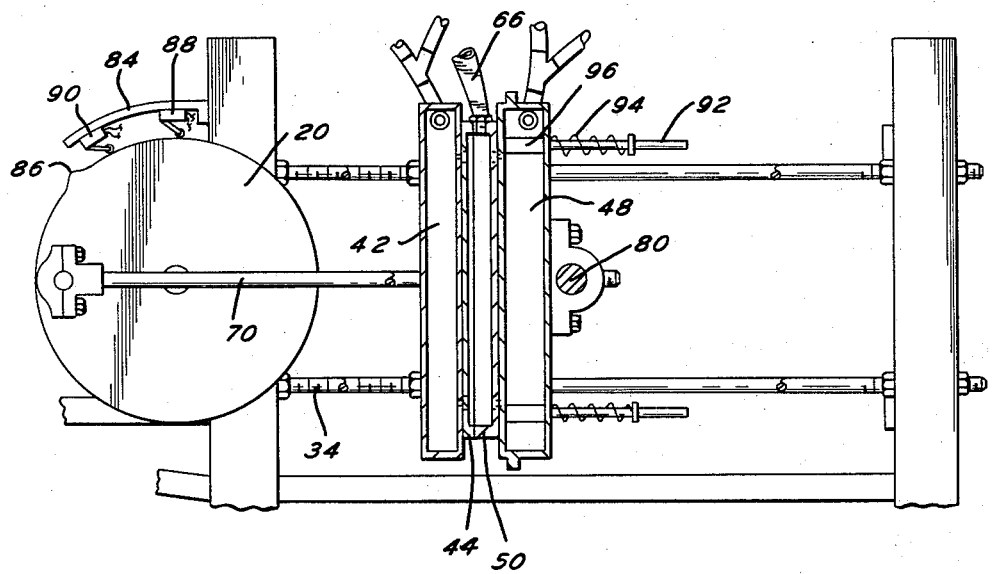
FIGURE 4 is a view similar to FIGURE 1 but on an enlarged scale and partly in section illustrating the position of the components of the molding press when the platens are closed.

Each of the platens includes a steam jacket and a mold cavity or chamber. Hence, the stationary platens 38 include a closed steam jacket 42 which carries on its front face a molding chamber 44. The molding chamber 44, for purposes of illustration, is substantially rectangular in cross section and has an open front facing the movable platen 40. Similarly, the movable platen 40 includes a substantially closed steam jacket 48 to which is secured a molding cavity or chamber 50. The molding chamber 50 is also rectangular in cross section. When the molding chambers 44 and 50 are brought together as shown in FIGURE 4, it will be apparent that a flat sheet of material can be molded because of the shape of the chambers. However, it should be understood that other shaped molds are contemplated by the present invention and may be easily adapted to the present apparatus. The molding chamber 50 of the movable platen 40 is deliberately made of a greater depth than the molding chamber 44 of the fixed platen 38 for purposes which will be made clear hereinafter.

A steam inlet conduit 54 enters the top of the steam jackets 42 and 48 on each of the platens. The steam is adapted to leave the jackets through a steam outlet conduit 56 extending from the bottom of each steam jacket. Similarly, a water inlet conduit 58 enters the top of each of the steam jackets, and a water outlet conduit 60 extends from the bottom of each steam jacket.

Supported above the frame 12 is a pellet hopper 62. The pellet hopper 62 is connected by means of a flexible conduit 66 to the molding cavity 50 on the movable platen 40. An air hose 68 is connected to the hopper 62. Upon the introduction of compressed air into the hopper 62 through the hose 68, polystyrene pellets 64 or the like are adapted to be forced through the flexible conduit 66 into the molding chamber or cavity 50.

Figure 3:
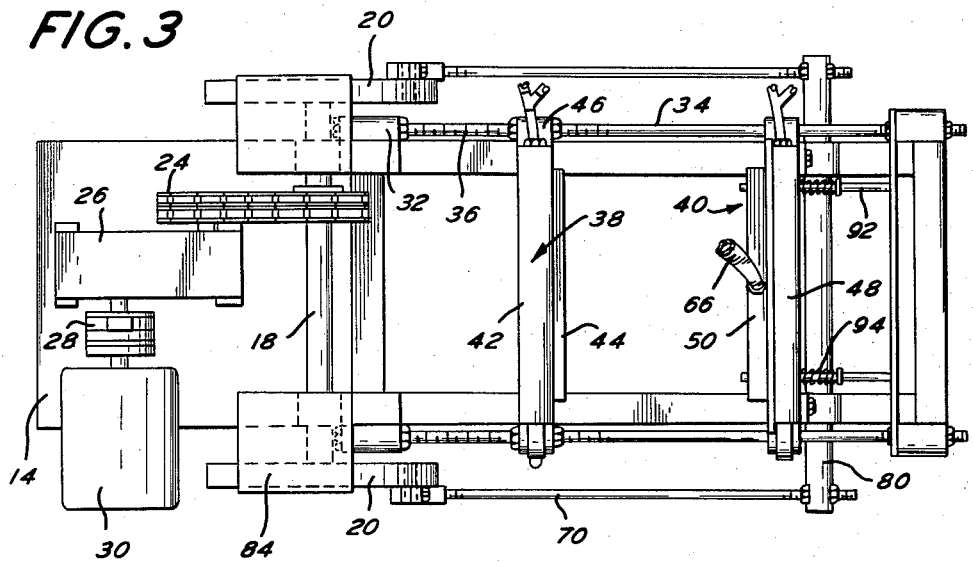
FIGURE 3 is a top plan view of the apparatus shown in FIGURE 1 taken substantially along the plane indicated by the line 3—3 of FIGURE 1.

In order to reciprocate the platen 40 with respect to the platen 38, a crank arm 70 is mounted eccentrically on each of the wheels 20 at one end and is connected to the movable platen 40 at its other end. A pin or stub shaft 72 is secured to each wheel 20 adjacent its periphery. A bearing 74 is mounted upon each of the shafts 72 and includes a threaded neck portion 76 for threadably receiving the crank arm 70. Secured to the rear face of the steam jacket 48 of the movable platen 40 are a pair of spaced bearings 78. A shaft 80 is positioned through each bearing 78 and terminates beyond each lateral boundary of the frame 12 as shown in FIGURE 3. A threaded bore is drilled in each of the ends of the shaft 80 for securely receiving a threaded end 82 of each of the crank arms 70.

In order to effect the operating cycle of the press completely automatically, a cam 86 extends from the circumference of each of the wheels 20. As the wheels 20 rotate they are adapted to close a plurality of microswitches such as shown at 88 and 90 to automatically condition the operation of the press. These microswitches are suspended from an arcute bracket such as 84 overlying a wheel 20. It should be understood that the microswitches beneath the bracket on the opposite side of the machine than that shown in FIGURE 1 may be contacted by a cam 86 on the wheel 20 which is out of phase with the cam 86 on the wheel 20 shown in FIGURE 1, thereby increasing the amount of controls available for the machine. Alternatively, more wheels may be mounted upon the shaft 18 to contact associated microswitches during spaced intervals of rotation of the shaft 18. If certain operations are to be carried out simultaneously, the last mentioned arrangement has obvious advantages.

A plurality of knock out pins 92 are adapted to be secured to the corners of the rear face of the movable platen 40. Since the molding chamber 50 presents a larger surface area to the finished molded product than the molding cavity 44 in the fixed platen, when the molds separate and are moved apart, the molded sheet will adhere to the mold chamber 50. Alternatively, an air blast may be provided in association with the cavity 44 for insuring that the molded sheet is removed from the mold cavity 44 when the platens separate.

The knock out pins 92 are adapted to remove the molded article or sheet from the mold chamber 50. Hence, each of the knock out pins 92 is reciprocably mounted in any suitable manner upon the rear face of the steam jacket 48 of the movable platen 40. A return spring 94 is coiled about each knock out pin 92 between the rear face of the steam jacket 48 and an abutment collar secured to the pin 92. Upon movement of the platen 40 away from the fixed platen 38, the pins 92 are adapted to strike an abutment positioned between the frame uprights. Continued movement of the platen 40 towards these abutments will result in the pins 92 being pushed through an opening 96 through the steam jacket and into the mold cavity or chamber 50 as shown clearly in FIGURES 1 and 3. When the platen 40 moves towards the fixed platen 38, the return springs 94 will return the knock out pins to their former mode.

The operation of the molding apparatus is substantially as follows:

The motor 30 is energized to rotate the shaft 18 through the magnetic friction clutch-brake unit and speed reduction unit. The motor 30 revolves at about 1800 r.p.m. and by means of the speed reduction unit, the shaft 18 and hence the wheels 20 can be made to turn as slow as 8 r.p.m. thereby allowing precision control of the movement of the cams 86 on each wheel.

As the wheels 20 rotate, they will cause the crank arm 70 to pull the movable platen 40 towards the fixed platen 38. When the molding chamber 50 of the movable platen 40 is adjacent to but slightly spaced from the molding chamber 44 on the fixed platen 38, the wheel 20 shown in FIGURES 1 and 4 will have momentarily closed the microswitches 88 and 90 by contact with the cam 86 on the periphery of the wheel 20. Closing of the switch 88 will energize a suitable electrical circuit which will cause the clutch of the clutch-brake unit 28 to become disengaged a suitable time after actuation of the switch 88. Meanwhile the wheel 20 will revolve to a position wherein the microswitch 90 has been momentarily closed. The closing of the microswitch 90 will energize a timing circuit which after a finite time interval will open a valve to allow air to flow through line 68 to force the pellets 64 to enter the molding cavity 50. The switch 90 can also energize a valve to allow steam to pass through the steam jackets on each platen.

Accordingly, when the cam 86 has reached a position as shown in FIGURE 4, the magnetic friction clutch of the clutch-brake unit 28 will be actuated to disengage the motor from the drive unit and therefore stop movement of the platen 40 adjacent to the fixed platen 38 but slightly spaced from it. This is what is commonly known as a stand-off position, and a gap between the moulding chambers of the platen is formed of the order of .010–.015 inch. As soon as the movement of the platen 40 has stopped, compressed air will be forced through the hose 68 and into the hopper 62 due to previous actuation of a valve by the microscitch 90. At the same time, steam will be allowed to flow into each of the steam jackets of the platen through the conduits 54 and out of the conduits 56. As air enters within the hopper 62, polystyrene pellets 64 will be forced through the flexible conduit 66 into the molding chamber 50. Heat will be transferred from each of the steam jackets to the molding chambers. The heat will cause the expansion of the pellets in the molding chambers to form a sheet. The gas generated by the expansion of the pellets 64 will escape through the gap between the molding chambers of each platen. After an interval of approximately 0–15 seconds, the clutch will be deenergized automatically and the platens will be brought into abutment with each other. Since the pressure built up by the expanding pellets is substantial, the magnetic friction brake of the clutch-brake unit will be energized at this time to prevent rotation of the wheels 20 and backing off of the movable platen.

During the movement of the shaft 18 to completely close the space between the platens, a third microswitch (not shown) could be eneregized by a cam 86 on the wheel 20 on the opposite end of the shaft 18 than the wheel 20 shown in FIGURES 1 and 4. After a finite time interval, this electrical control can open a suitable valve to allow cooling water to flow through the conduits 58, through each steam jacket in the platens, and out the conduits 60. This will cool the molded article thereby conditioning it for removal.

After a finite time interval, the brake of the clutch-brake unit 28 will automatically be released and the wheels allowed to resume their rotation. Continued rotation from the position shown in FIGURE 4 will cause the platens to move apart.

Since the molding chamber 50 on the movable platen presents a larger surface area to the molded object than the molding chamber 44 in the fixed platen 38, the molded object will adhere to the walls of the molding cavity 50. To insure this, a suitable electrical control can be energized by the cam 86 on either wheel 20 to initiate a blast of air to loosen the molded object from the mold cavity 44.

Continued movement of the platen 40 will cause the knock out pins 92 to abut a surface on the frame which causes the pins 92 to move through the holes 96 in the steam jacket 48 into the molding cavity 50 to knock out the molded sheet or object from the chamber. When the movable platen 50 resumes its return stroke towards the fixed platen 38, the springs 94 will return the pins 92 to their former mode.

A suitable clutch-brake unit which can be used with the present invention is one manufactured by the Eaton Manufacturing Company of Kenosha, Wisconsin and sold under the tradename of "Dyna-Torq."

In the event it is desirable to increase or decrease the gap formed between the platens when they are juxtaposed to each other, this can be readily accomplished with the apparatus of the present invention. All that is necessary is to rotate the tie bars 34 to cause the relatively fixed platen 38 to retreat or advance from the initial starting position of the movable platen 40. Alternatively, the maximum travel of the movable platen may be adjusted by shortening or lengthening the crank arm 70 by means of its threaded connections.

It will now be appreciated that a molding press has been disclosed which requires a minimum number of components to effect a continuous automatic operating cycle for molding objects. Due to the simplicity of the press, the lower costs of construction are passed on to the consumer. In addition, the controls of the operating cycle allow for a maximum of adjustment and versatility of the operating procedure.

The present invention may be embodied in other specific forms without departing from the spirit or essential attributes thereof and, accordingly, reference should be made to the appended claims, rather than to the foregoing specification as indicating the scope of the invention.

I claim:

1. Molding apparatus comprising a movable platen, a relatively fixed platen, each platen including a heating jacket adapted to receive a heat transfer medium and an open molding chamber juxtaposed to said heating jacket, the molding chamber on each of said platens opening towards each other, rotary means for imparting reciprocable movement to said movable platen towards and away from said fixed platen, control means actuatable by said rotary means for momentarily stopping travel of said movable platen before it reaches said relatively fixed platen, and means for feeding a plurality of moldable pellets into one of said molding chambers during the momentary stop in the travel of said movable platen.

2. Molding apparatus in accordance with claim 1 wherein said control means includes means for momentarily stopping said movable platen when its molding chamber is adjacent to but slightly spaced from the molding chamber in said fixed platen.

3. Molding apparatus in accordance with claim 2 including means for adjusting the gap formed between said movable and fixed platens when the travel of said movable platen is momentarily stopped.

4. Molding apparatus comprising a movable platen, a relatively fixed platen, each platen including a heating jacket adapted to receive a heat transfer medium and an open molding chamber juxtaposed to said heating jacket, the molding chamber on each of said platens opening towards each other, unidirectional rotary means for imparting reciprocable movement to said movable platen towards and away from said fixed platen, means for feeding a plurality of moldable pellets into one of said molding chambers, means for introducing a heat transfer medium into said heating jackets, and control means actuatable by said unidirectional rotary means for momentarily stopping the travel of said movable platen before it reaches said relatively fixed platen and conditioning said feeding means and heat transfer introduction means for operation.

5. Molding apparatus comprising a frame, a first platen reciprocably mounted on said frame, a second platen mounted on said frame and fixed relative to said first platen, each platen including a heating jacket adapted to receive a heat transfer medium and an open molding chamber juxtaposed to said heating jacket, the molding chamber on each of said platens opening towards each other, at least one wheel rotatably mounted on said frame, a crank arm pivotably and eccentrically mounted on said wheel and connected to said movable platen, drive means connected to the wheel for effecting unidirectional rotation of the wheel and reciprocation of said first platen towards and away from said fixed platen, means adjacent said frame for feeding moldable pellets to one of said molding chambers, means connected to said platens for introducing a heat transfer medium into said heating jackets, cam means on said wheel, and means adjacent said wheels for momentarily stopping said drive means in response to contact with said cam means, said last-named means initiating operation of said pellet feeding means and heat transfer medium introduction means during said momentary stop of said drive means.

6. Molding apparatus in accordance with claim 5 wherein said last-named means momentarily stops said drive means when the molding chamber of said movable platen is adjacent to but slightly spaced from the molding chamber on said fixed platen.

7. Molding apparatus in accordance with claim 5 including tie bars rotatably mounted on said frame, means precluding axial movement of said tie bars with respect to said frame, means threadably connecting said second platen to said tie bars, and means slidably connecting said first platen to said tie bars.

8. Molding apparatus comprising a frame, a first platen reciprocably mounted on said frame, a second platen mounted on said frame and fixed relative to said first platen, each platen including a heating jacket adapted to receive a heat transfer medium and an open molding chamber juxtaposed to said heating jacket, the molding chamber on each of said platens opening towards each other, at least one wheel rotatably mounted on said frame, a crank arm pivotably and eccentrically mounted on said wheel and connected to said movable platen, drive means connected to the wheel for effecting unidirectional rotation of said wheel and reciprocation of said first platen towards and away from said fixed platen, means adjacent said frame for feeding moldable pellets into one of said molding chambers, means connected to said platens for introducing a heat transfer medium into said heating jackets, cam means on said wheel, and means adjacent said wheel for initiating operation of said pellet feeding means and heat transfer medium introduction means in response to contact with said cam means.

9. Molding apparatus comprising a frame, a first platen reciprocably mounted on said frame, a second platen mounted on said frame and fixed relative to said first platen, each platen including a heating jacket adapted to receive a heat transfer medium and an open molding chamber juxtaposed to said heating jacket, the molding chamber on each of said platens opening towards each other, at least one wheel rotatably mounted on said frame, a crank arm pivotably and eccentrically mounted on said wheel and connected to said movable platen, drive means connected to the wheel for effecting unidirectional rotation of said wheel and reciprocation of said first platen towards and away from said fixed platen, means adjacent said frame for feeding moldable pellets into one of said molding chambers, means connected to said platens for introducing a heat transfer medium into said heating jackets, cam means on said wheel, means adjacent said wheel for initiating operation of said pellet feeding means and heat transfer medium introduction means in response to contact with said cam means, and knock out means for removing a molded article from the molding chamber of said first platen, said knock out means including at least one spring-biased plunger adapted to be thrusted through said molding chamber by contact with said frame upon movement of said first platen in a direction away from said second platen at the end of the rotation cycle of said wheel.

References Cited by the Examiner

UNITED STATES PATENTS

| | | | |
|---|---|---|---|
| 2,035,801 | 3/1936 | Gastrow | 18—30 |
| 2,193,787 | 3/1940 | Berry | 18—30 |
| 2,333,056 | 10/1943 | Thoreson et al. | 18—30 |
| 2,353,825 | 7/1944 | Hofmann. | |
| 3,139,466 | 6/1964 | Couchman | 18—5 XR |
| 3,141,192 | 7/1964 | Benedetto | 18—5 |
| 3,159,875 | 12/1964 | Stutz et al. | 18—5 |

FOREIGN PATENTS 883,248  6/1943  France.

OTHER REFERENCES

"Foam Goes Automatic" by Frank Lambert, Modern Plastic, February 1961, pages 107–110, 112, 180, 181, 183 and 185.

WILLIAM J. STEPHENSON, *Primary Examiner.*